United States Patent [19] [11] 4,047,705

Hanslik [45] Sept. 13, 1977

[54] EXTRUDER WITH DUAL TAPERED SCREWS

[75] Inventor: Wilhelm Hanslik, Linz, Austria

[73] Assignee: Krauss-Maffei Aktiengesellschaft, Munich, Germany

[21] Appl. No.: 616,375

[22] Filed: Sept. 24, 1975

[30] Foreign Application Priority Data

Sept. 28, 1974 Germany ............................ 2446420

[51] Int. Cl.[2] ............................ B01F 7/08; B29B 1/10

[52] U.S. Cl. .................................................... 259/192

[58] Field of Search ................. 259/192, 191; 198/161

[56] References Cited

U.S. PATENT DOCUMENTS

| | | | |
|---|---|---|---|
| 3,749,375 | 7/1973 | Hermann et al. .................... | 259/192 |
| 3,804,382 | 4/1974 | Pultz .................................. | 259/192 |

*Primary Examiner*—Richard E. Aegerter
*Assistant Examiner*—Willis Little
*Attorney, Agent, or Firm*—Karl F. Ross

[57] ABSTRACT

An extruder has a housing in which is rotatable a pair of axially tapered screws of like construction but opposite hand. The thread of each screw meshes with that of the other screw so that the screws' major diameters overlap by a distance that forms a constant ratio with the major diameter along the entire length of the screws.

4 Claims, 3 Drawing Figures

1 I 5 3 4 6 3d 8 10 3c 3b 3a 17 12 I 14

1
2
3
7
8
9
10
11
12
13
14
15
16
17
II
III

A
P
A
17
16
13
14
3a
15
2a
3b
2b
3c
2c
3
2
10
9
I
I
8
7
12
11
3d
2d
1
6
15

17
14
4
3a
3b
3
3c
5
10
I
I
8
12
3d
1
6

EXTRUDER WITH DUAL TAPERED SCREWS

CROSS REFERENCE TO RELATED APPLICATION

This application is related to my copending patent application No. 400,059 filed Sept. 24, 1973, now U.S. Pat. No. 3,927,869.

Field of the Invention

The present invention relates to a multiscrew extruder. More particularly this invention concerns a dual-screw extruder as is used with thermoplastic synthetic resins in powder or granulate form.

BACKGROUND OF THE INVENTION

Extruders are known having a pair of like screws tapered axially from an inlet end toward an outlet end. This taper is achieved by decreasing the minor or root diameter, a dimension equal to twice the radial distance between the central axis of the screw and the base of the root region between adjacent turns of flight of the screw thread, with the screw threads of the two screws being of constant radial depth from the inlet end to the outlet end of the extruder. Thus the difference between the major and minor diameters of the thread remains equal but the ratio between the thread depth, equal to half the difference between the major and minor diameters, and the minor or major diameter varies along the screw, decreasing from the output side toward the input side of the screws.

Added to this ratio variation is the considerable radially directed shear in the synthetic-resin mass being worked by the screws at the input end regions of the screws. It is necessary to maintain the axial compression of the plastified mass in the extruder within a close range because of the sensitivity to pressure of most molding operations. In addition this particular construction has the disadvantage that the synthetic-resin mass in the degassing zone has a volume which is relatively small. Since this particular volume is determinative of the output of the machine, any limitation on it limits the capacity of the extruder.

Whether the two screws are of like hand, and are, therefore, rotated in the same direction or of opposite hand and rotated in opposite directions, considerable disadvantages remain with this type of construction.

OBJECTS OF THE INVENTION

It is therefore an object of the present invention to provide an improved extruder.

Another object is the provision of a dual-screw extruder for synthetic-resin material which has axially tapered screws yet overcomes the above-given disadvantages.

SUMMARY OF THE INVENTION

These objects are attained according to the present invention in an extruder whose housing contains a pair of intermeshing screws each of whose outer or major diameter decreases from the inlet end toward the outlet end. The central and rotation axes of these two screws are coplanar and converge in the downstream conveying direction. The ratio between the thread depths, that is the difference between the major and minor diameters of each of the screws, and the major diameter of each of the screws at the corresponding location remains substantially equal throughout the screws between the inlet and outlet ends. Thus this thread depth, which also corresponds to the depth of mesh between the two screws, remains in a fixed ratio to the major screw diameter, the two dimensions varying in the same proportion along the screws.

The extruder according to the present invention therefore is provided with oppositely driven tapered screws which combine the advantages of cylindrical and conical screws without having the disadvantages of either type. It is for instance a relatively simple matter to maintain the same ratio between screw overlap or thread depth and screw major diameter as has been proven to be highly efficient in cylindrical-screw machines. An overlap of between 15% and 25% (corresponding to a ratio range of 15:100 to 25:100), depending on the viscosity of the resin being plastified, has been found most advantageous in machines working thermoplastic synthetic-resins. In the plastification of hard polyvinyl chloride an overlap of between 18% and 20% (corresponding to a ratio range of 18:100 to 20:100) has shown itself to be most efficient.

Screw-type extruders for plastifying synthetic-resin material with small or average outputs are often not provided with dosing devices. As a result of this type of construction considerable variations are present at the output end in the strand being extruded. It is known to eliminate these variations at least partially in the degassing zone of the screws. A volume reserve is created in this degassing zone to even out the throughput of the extruder. Such a volume reserve is of considerable importance with the system according to the present invention. It may be increased, thereby increasing the efficiency of the degassing zone, by up to 50%.

With the system according to the present invention the extrusion process will progress smoothly almost regardless of the type of synthetic-resin material being plastified. Considerable variation in the throughput can be achieved so that the machine can be adapted for any type of process. These advantages are principally due to the relatively great depth of the thread in the preplastification zone of the screws so that the system is not very sensitive to rotary speed of these screws. This makes the synthetic-resin material pass more quickly through this particular zone so that it is possible to control the process with heaters in the plastifier and to provide a relatively short preplastification zone to reduce production costs considerably. In addition with the system according to the present invention using double conical screws, compared to the known conical screws, great reduction in cross-sectional area is achieved in the transport direction. This results in a corresponding compression of the material being plastified.

BRIEF DESCRIPTION OF THE DRAWING

The above and other objects, features, and advantages of the present invention will become more readily apparent from the following, reference being made to the accompanying drawing in which.

SPECIFIC DESCRIPTION

Figure 1:
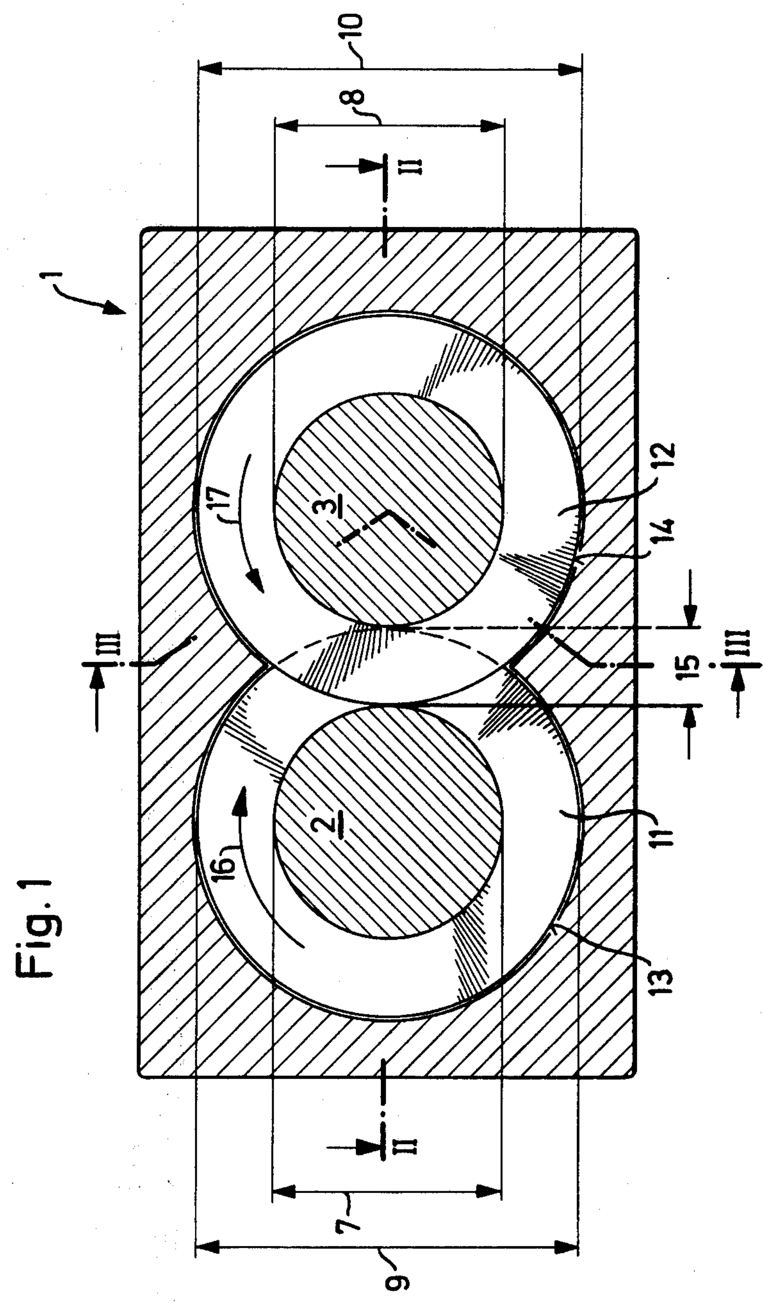
FIG. 1 is a cross section through an extruder in accordance with this invention.
Figure 2:
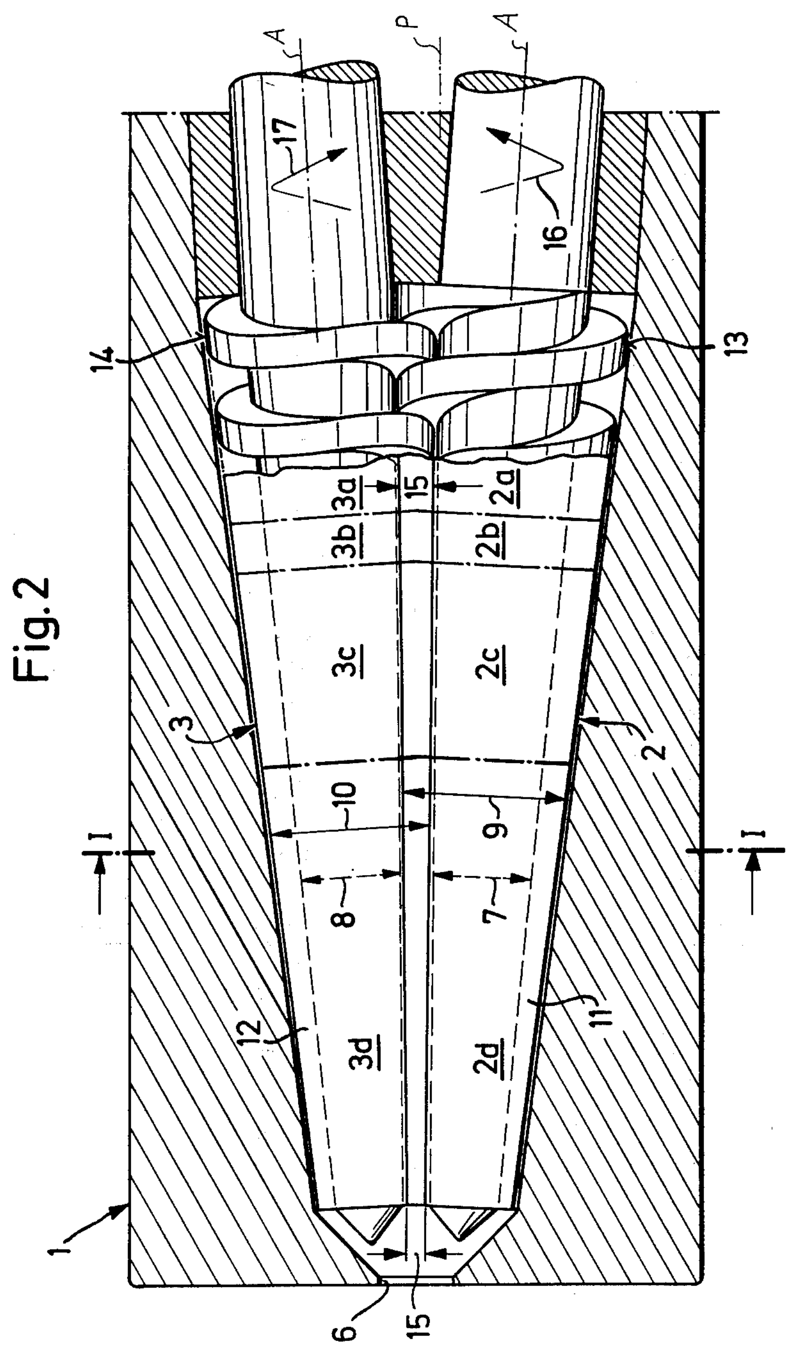
FIGS. 2 and 3 are sections taken along lines II—II and III—III of FIG. 1, respectively, the section line for FIG. 1 being shown in FIGS. 2 and 3 at line I—I.
Figure 3:
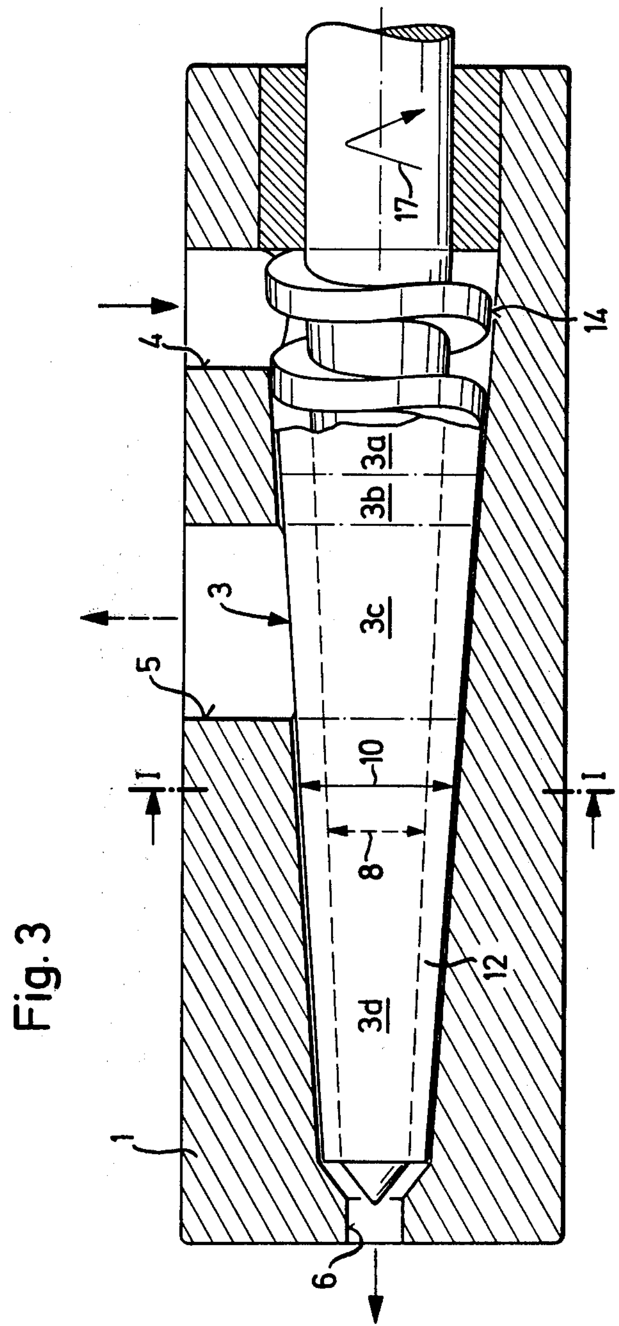

As shown in FIGS. 1-3 the extruder according to the present invention has a housing 1 in which is provided a pair of intermeshed screws 2 and 3 subdivided respectively into input or preplastification zones *2a* and *3a*, restriction zones *2b* and *3b*, degassing zones *2c* and *3c*, and output zones *2d* and *3d*, respectively. The synthetic-resin material is fed into the housing through an inlet opening 4 at the upstream end of the housing and is ejected from an outlet opening 6 at the opposite end. Between these two openings 4 and 6 there is provided a further opening 5 at the degassing zones *2c* and *3c*. The assembly is symmetrical about a plane P bisecting the housing and lying midway between the axes A of the two screws 2 and 3.

The screws 2 and 3 are tapered axially in the direction D with both the minor diameters 7 and 8 and major diameters 9 and 10 decreasing in this direction. In the same direction the passages 11 and 12 formed by the threads 13 and 14 of the screws 2 and 3 similarly decrease in cross-sectional area so that the overlap 15 between the meshing screws 2 and 3 similarly decreases. The overlap distance 15 forms a ratio with either of the major diameters 9 and 10 that is constant and is equal substantially to 1:5.

The screws 2 and 3 are driven in opposite directions as shown by arrows 16 and 17 in FIG. 1. Thus the depth of the passages 11 and 12 as well as the overlap at any given location does not change as the rotors turn. The two rotors or screws 2 and 3 are therefore substantially identical but of opposite hand. They are made of steel and are driven in accordance with my above-cited patent application in opposite directions at the same angular speed.

I claim:

1. An extruder comprising:

a housing having an inlet end and an outlet end and formed with a pair of elongated screw chambers conically converging from said inlet end to said outlet end, the axes of said chambers converging from said inlet end to said outlet end; and a pair of similar elongated screws extending axially between said ends in the respective chambers, said screws having screw threads of opposite hand meshing radially with a depth of mesh substantially equal to the thread depth, said threads having crests converging from said inlet end to said outlet end and having outer diameters progressively decreasing along the length of each screw from said inlet end toward said outlet end, the root diameter of each screw progressively decreasing from said inlet end toward said outlet end, each thread having a thread depth progressively decreasing from said inlet end toward said outlet end, the outer diameter of each thread constituting the major diameter thereof at any specific location along said length, the depth of mesh and the major diameter of each screw at each such location forming a ratio between substantially 15:100 and 25:100 and which is substantially constant between said ends.

2. The extruder defined in claim 1 wherein said ratio is between 18:100 and 20:100.

3. The extruder defined in claim 1 wherein each screw has an axis of rotation, said axes being mutually inclined toward one another in the direction of said outlet end and being coplanar.

4. The extruder defined in claim 1 wherein said housing is formed with a laterally open degassing opening between said ends.

* * * * *